(12) United States Patent
Berghold-Markom

(10) Patent No.: US 11,810,477 B2
(45) Date of Patent: Nov. 7, 2023

(54) APPARATUS FOR SIMULATING MOTION

(71) Applicants: Christian Berghold-Markom, Neulengbach (AT); Daniel Schneider, North York (CA)

(72) Inventor: Christian Berghold-Markom, Neulengbach (AT)

(73) Assignees: Christian Berghold-Markom, Neulengbach (AT); Daniel Schneider, North York (CA)

( * ) Notice: Subject to any disclaimer, the term of this patent is extended or adjusted under 35 U.S.C. 154(b) by 640 days.

(21) Appl. No.: 17/049,395

(22) PCT Filed: Apr. 8, 2019

(86) PCT No.: PCT/EP2019/058765
§ 371 (c)(1),
(2) Date: Oct. 21, 2020

(87) PCT Pub. No.: WO2019/211062
PCT Pub. Date: Nov. 7, 2019

(65) Prior Publication Data
US 2021/0166576 A1   Jun. 3, 2021

(30) Foreign Application Priority Data

May 3, 2018   (EP) .................................. 18170511

(51) Int. Cl.
*G09B 9/02* (2006.01)
*G09B 9/04* (2006.01)
*G09B 9/12* (2006.01)

(52) U.S. Cl.
CPC .................. *G09B 9/02* (2013.01); *G09B 9/04* (2013.01); *G09B 9/12* (2013.01)

(58) Field of Classification Search
CPC ............... G09B 9/02; G09B 9/04; G09B 9/12
See application file for complete search history.

(56) References Cited

U.S. PATENT DOCUMENTS

| 4,030,207 | A |   | 6/1977 | Kron |   |
|---|---|---|---|---|---|
| 5,980,255 | A | * | 11/1999 | Mathieu | ................... G09B 9/10 434/30 |

(Continued)

FOREIGN PATENT DOCUMENTS

| WO | 80/01011 A1 | 5/1980 |
|---|---|---|
| WO | 99/09538 A1 | 2/1999 |

OTHER PUBLICATIONS

Sim Racing Garage, GS-4 "G" Seat Review, https://www.youtube.com/watch?v=Yngl5OmcpPM, Available Jan. 8, 2017 (Accessed Aug. 22, 2023) (Year: 2017).*

(Continued)

*Primary Examiner* — Jay Trent Liddle
*Assistant Examiner* — Alyssa N Brandley
(74) *Attorney, Agent, or Firm* — Hoffmann & Baron, LLP

(57) ABSTRACT

The disclosed subject matter relates to an apparatus for simulating motion, comprising: a base; a seat with a seat pan and seat back, the seat having a roll axis and, orthogonal thereto, a pitch axis; a mount mounting the seat to the base at least pivotably about said roll axis and said pitch axis; a left seat back flap and a right seat back flap each of which being pivotably attached to a respective side of the seat back; and a linkage linking said seat back flaps to the base so that, when any one of the sides of the seat back is moved towards the base, the respective seat back flap is pivoted inwards and, when said side of the seat back is moved away from the base, said seat back flap is pivoted outwards.

15 Claims, 3 Drawing Sheets

(56) References Cited

U.S. PATENT DOCUMENTS

2012/0288831 A1\* 11/2012 Campion ............... G09B 9/048
    434/62
2016/0288752 A1 10/2016 Stancato et al.

OTHER PUBLICATIONS

European Search Report on Priority Application No. 18170511.2-1222, dated Dec. 12, 2018.
International Search Report and Written Opinion on Priority International Application on PCT/EP2019/058765, dated Apr. 8, 2019.
International Preliminary Report on Patentability in corresponding International Application No. PCT/EP2019/058765 dated Nov. 3, 2020.

\* cited by examiner

APPARATUS FOR SIMULATING MOTION

CROSS-REFERENCE TO RELATED APPLICATIONS

This application is a National Phase application of International Application No. PCT/EP2019/058765 filed Apr. 8, 2019 which claims priority to the European Patent Application No. 18 170 511.2 filed May 3, 2018, the disclosures of which are incorporated herein by reference.

TECHNICAL FIELD

The disclosed subject matter relates to an apparatus for simulating motion, the apparatus comprising a base, a seat with a seat pan and a seat back, and a mount mounting the seat to the base at least pivotably about a roll axis and a pitch axis of the seat.

BACKGROUND

Apparatuses for simulating motion are used, e.g., in flight simulators for professional training of pilots, in driving or auto racing simulators for training of drivers, or in video gaming, for example together with virtual reality headsets worn by a player. In these applications, the apparatus is connected to a motion simulation controller.

Different classes of such motion simulation apparatuses are known. The first and most elaborate class thereof uses a platform, also known as Steward Platform, which is mounted to the base by six jacks (i.e. linear actuators) in a hexapod arrangement. Such platforms usually offer space for two or more seats and provide full six degrees of freedom, i.e. the ability to both shift along and pivot about each of the roll axis, the pitch axis and a yaw axis orthogonal to each other. Simpler systems of this class merely move a single seat and/or offer only fewer degrees of freedom, e.g., only pivoting about the three orthogonal axis. Besides being rather complex and thus expensive, such platforms are limited in dynamics: After each movement, they require a period of re-setting to their home position with a movement sufficiently slow to fall below a person's motion detection threshold; this re-setting is also known as "washout".

Motion simulation apparatuses of a second class exploit the fact that human brain can be deceived by short, quick movements only giving a cue to acceleration or deceleration, which is interpreted by the brain as being continuous; this principle is known as "motion cueing". Motion cueing can, e.g., be achieved by slightly pivoting and/or shifting a seat by actuators. This, however, leads to a similar complexity as full-motion systems. Simpler apparatuses of this class merely use inflatable pads in the seat pan and/or in the seat back and, in some cases, controllable tensioners for the seat belts. As the apparatuses of this class move lower masses and require no or only little washout movements, they can be deployed in applications of higher dynamic. However, for achieving more than only rudimental motion cueing, e.g. in different directions, several inflatable pads are to be installed and controlled which increases complexity and cost of such apparatuses. When, on the other hand, the number of inflatable pads is reduced for simplicity reasons, the impression of motion is largely degraded.

BRIEF SUMMARY

It is thus an object of the disclosed subject matter to provide an apparatus for simulating motion, which has a simple and robust structure and facilitates a high-grade motion simulation.

This object is achieved with an apparatus for simulating motion, comprising: a base; a seat with a seat pan and a seat back, the seat having a roll axis and, orthogonal thereto, a pitch axis; and a mount mounting the seat to the base at least pivotably about said roll axis and said pitch axis; a left seat back flap and a right seat back flap each of which being pivotably attached to a respective side of the seat back; and a linkage linking said seat back flaps to the base so that, when any one of the sides of the seat back is moved towards the base, the respective seat back flap is pivoted inwards and, when said side of the seat back is moved away from the base, said seat back flap is pivoted outwards.

The disclosed subject matter is based on the finding that, by linking the seat back flaps to the base, very effective motion cueing is achieved. This is accomplished in a simple and robust way by the proposed seat which is pivotable about said roll axis in longitudinal direction and about said pitch axis in lateral direction and has left and right seat back flaps linked to the base. The left and right seat back flaps may, e.g., be attached to the seat back left and right of the seat back's center or at the lateral edges thereof.

Herein, a movement of a flap towards a person sitting in the seat is denoted as pivoting "inwards," whereas a movement of a flap away from the person is denoted as pivoting "outwards." When pivoting inwards, each seat back flap applies a force to the body of the person. This force is perceived by the person as being pressed into the respective side of the seat due to acceleration and enhances the effect of pivoting the seat about the roll and/or the pitch axis. Left and right flaps are moving independently from each other, merely depending on the movement of the respective side of the seat back. However, when the seat back is moved towards the base (or away from it) as a whole, both left and right flaps are pivoted inwards (or outwards, respectively) simultaneously which is perceived by the person as being pressed into the seat.

In an optional embodiment, said linkage comprises a first push rod and a second push rod, each of said first and second push rods having one end coupled to the base and the other end coupled, directly or via a gear, to the respective seat back flap. Thereby, a reliable and simple linkage is achieved which works independently for each side of the seat back.

In the embodiment where said other end of each of the first and second push rods is coupled to the respective seat back flap via a gear, the gear optionally comprises a pulley and a link to said seat back flap, the pulley being mounted to the seat back rotatably about an axis parallel to said pitch axis, and each of said link and said other end being eccentrically articulated on the pulley. Such a gear is space-saving, yet reliable. The articulation of said link and said other end on the pulley can be chosen so that force and pivoting angle of the respective seat back flap is adapted to particular requirements.

In another advantageous embodiment the seat pan has a left seat pan flap and a right seat pan flap each of which being pivotably attached to a respective side of the seat pan, and a further linkage linking said seat pan flaps to the base so that, when any one of the sides of the seat pan is moved towards the base, the respective seat pan flap is pivoted inwards and, when said side of the seat pan is moved away from the base, said seat back flap is pivoted outwards. With only few additional components, the effect of motion cueing can thereby be further enhanced.

In a beneficial variant thereof, said further linkage comprises a third push rod and a forth push rod, each of said third and forth push rods having one end coupled to the base and the other end coupled to the respective seat pan flap. This structure for controlling the pivoting of the seat pan flaps is as simple as it is reliable; similar to the seat back flaps, force and pivoting angle of the respective seat pan flap can be adapted to particular requirements.

Favorably, the apparatus comprises a lap belt passed over the seat pan, wherein both ends of the lap belt are attached to the base. It is further advantageous, when the apparatus comprises a left and a right shoulder strap, wherein at least one end of each shoulder strap is attached to the base. Thereby, the effect of tightening and loosening lap belt and/or shoulder straps can be achieved in a simple, yet realistic way.

In the embodiment where pulleys are rotatably mounted to the seat back, each of which being a part of a respective gear for linking the left or the right seat back flap to the base, and where the apparatus comprises a left and a right shoulder strap, it is particularly advantageous when one end of each shoulder strap is attached to the circumference of the respective pulley. This facilitates the tightening and loosening of the shoulder straps; in dependence on the size of the pulley's circumference a transmission ratio between the movement of the seat back relative to the base and the tightening and loosening of the shoulder straps can be achieved. This configuration also reduces the number of attachment points on the base and, consequently, the space required therefor.

For easing the process of fastening the lap belt and shoulder straps, the apparatus optionally comprises a left and a right shoulder strap, one end of each shoulder strap is coupled to the lap belt. Such coupling can be permanent, e.g., by sewing the shoulder straps on the lap belt, or temporary, e.g., by means of a safety belt lock.

According to an advantageous embodiment of the apparatus, the mount comprises a gimbal joint with two degrees of freedom, which gimbal joint mounts a forepart of the seat pan to the base pivotably about said roll axis and said pitch axis. This embodiment is particularly simple.

More sophisticated effects of motion cueing can be achieved by an alternative embodiment, where the mount comprises a gimbal joint with two degrees of freedom and a lever, wherein one end of the lever is mounted to the base pivotably about a horizontal axis and wherein the other end of the lever carries said gimbal joint to mount the seat pivotably about said roll axis and said pitch axis. In this embodiment, lifting and lowering of the seat can be achieved independently from pitching, while the overall structure of the apparatus simple and robust.

The mount beneficially comprises an elastic element extending between a rear portion of the seat pan and the base. This helps saving energy during operation of the apparatus by compensating for gravitational forces.

Optionally, the mount comprises a first and a second actuator for pivoting the seat about said roll axis and said pitch axis. Thereby, external motors or drives for simulating motion are no longer necessary; the apparatus solely has to be connected to and controlled by an external controller. The first and second actuators induce a rolling about the rolling axis and a pitching about the pitch axis together, e.g., in that one of the two actuators induces the rolling and the other one induces the pitching, or in that each actuator is positioned at one of the sides of the seat back or seat pan and the actuators collectively induce both pitching and rolling, i.e. by respective parallel and counter-parallel (antagonistic) operation and by combinations thereof.

Moreover, the mount optionally further comprises a third actuator for lifting and lowering the seat, together with said first and second actuators. The first, second and third actuators, thereby, collectively serve to roll the seat about the roll axis, to pitch the seat about the pitch axis and to lift and lower the seat. Controlling these three degrees of freedom together with the seat back flaps and the optional seat pan flaps permits a particularly realistic simulation of motion.

Favorably, the mount comprises at least one further elastic element for bringing the seat in a rest position relative to the base. This serves to ease the sitting down and standing up for a person without necessarily actuating and controlling the apparatus already in such a moment. Moreover, the forces needed for bringing the seat into the rest position decrease.

BRIEF DESCRIPTION OF THE DRAWINGS

The disclosed subject matter shall now be explained in more detail below on the basis of an exemplary embodiment thereof with reference to the accompanying drawings, in which.

DETAILED DESCRIPTION

Figure 1:
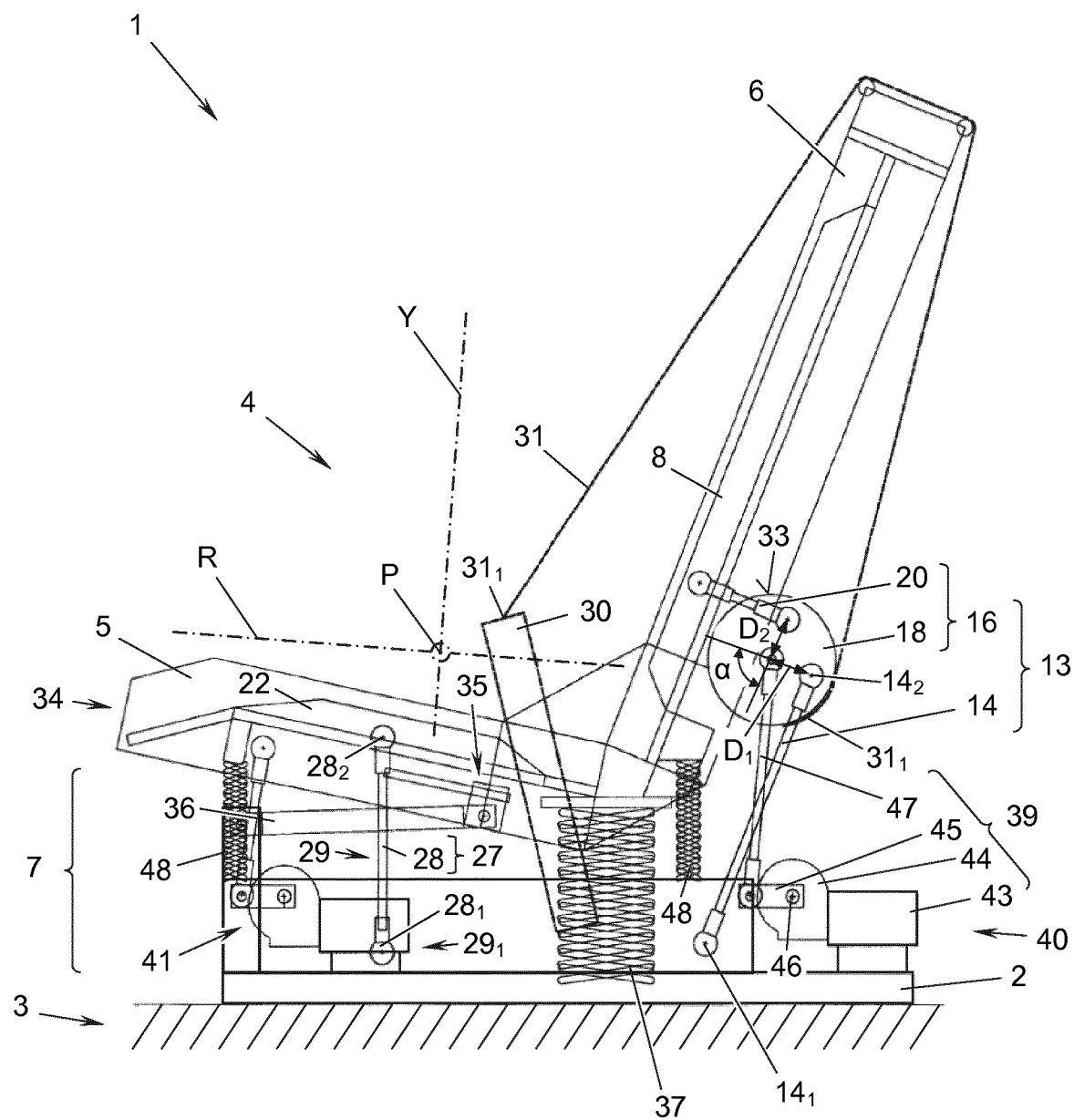
FIG. 1 shows an example of an apparatus for simulating motion according to the disclosed subject matter in a partly transparent side view.

FIGS. 1 to 4 show an example of an apparatus 1 for simulating motion; for better visibility of the apparatus 1 and the components thereof, the views are partly transparent. The apparatus 1, which can be connected to a motion simulation controller (not shown), comprises a base 2 mounted to or resting on a ground 3, a seat 4 with a seat pan 5 and a seat back 6, and a mount 7 which mounts the seat 4 to the base 2. The seat 4 has a roll axis R in longitudinal direction, a pitch axis P orthogonal thereto in lateral direction, and a yaw axis Y orthogonal to both roll and pitch axis R, P. The mount 7 allows at least pivoting of the seat 4 about said roll axis R and said pitch axis P. Such pivoting includes the movement about both the roll axis R and the pitch axis P simultaneously, which could also be seen as a pivoting movement about a single axis in a plane of both said roll axis R and said pitch axis P.

Figure 2:
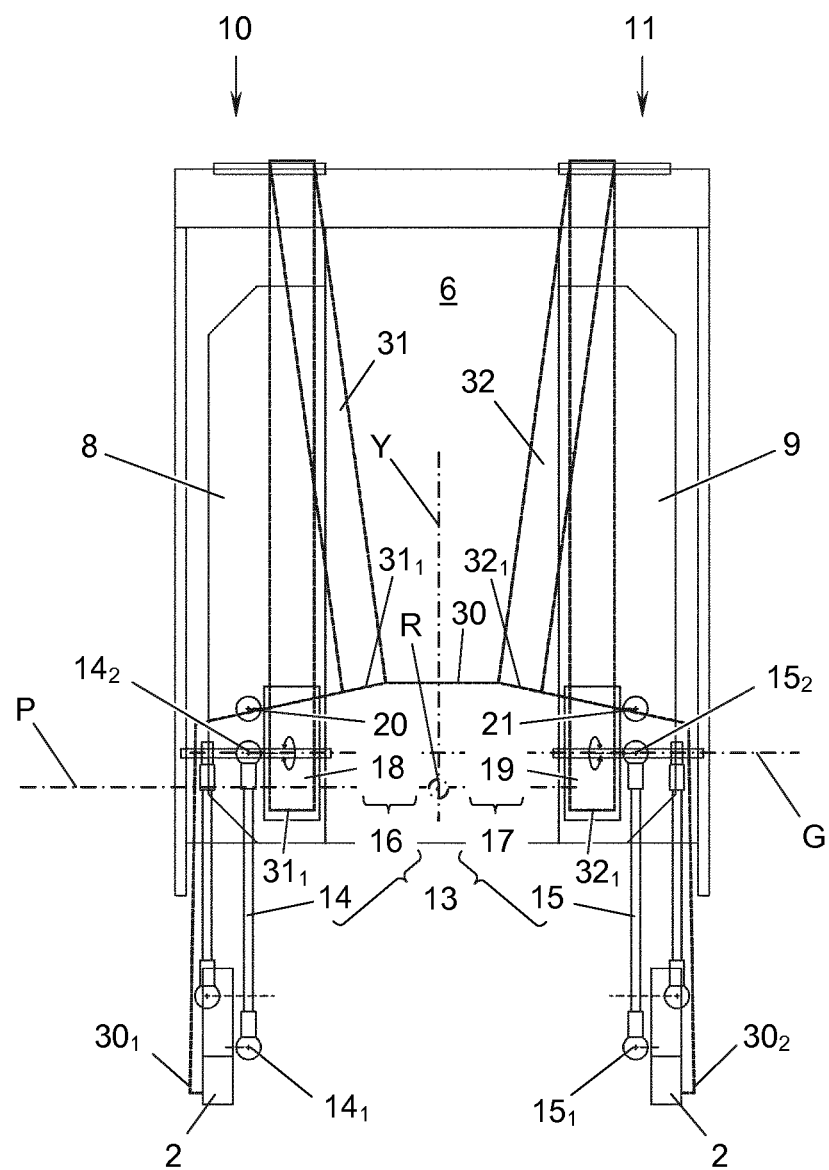
FIG. 2 shows a portion of the apparatus of FIG. 1 in a partly transparent back view.
Figure 3:
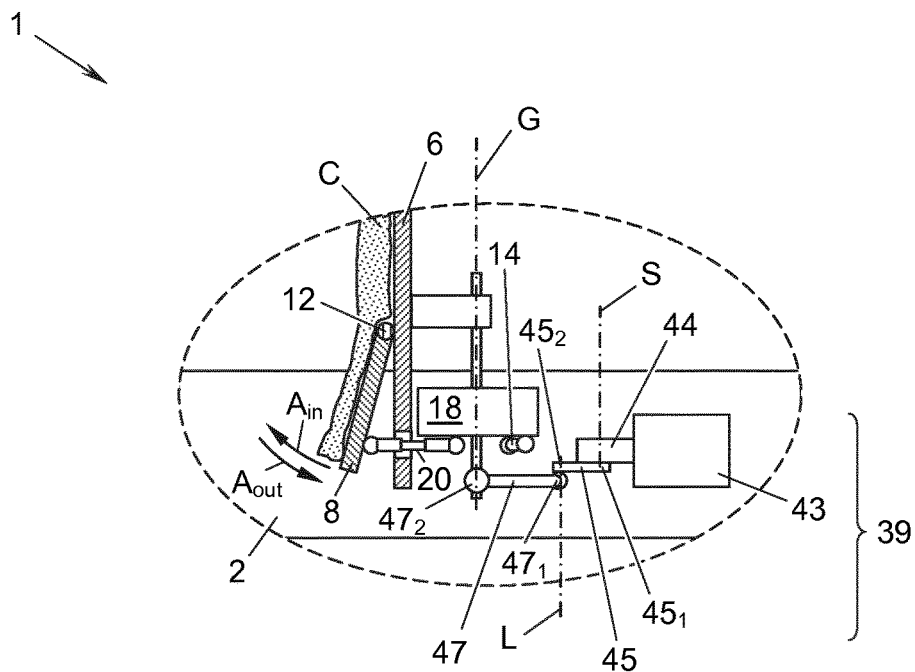
FIG. 3 shows a detail of a seat back of the apparatus of FIG. 1 in a cross sectional view from above.

As shown in FIGS. 1 to 3, the seat back 6 has a left seat back flap 8 and a right seat back flap 9. The left seat back flap 8 is pivotably attached to the left side 10 of the seat back 6 and the right seat back flap 9 is pivotably attached to a right side 11 of the seat back 6 by a respective hinge 12.

The seat back flaps 8, 9 are linked to the base 2 by a first linkage 13 in a way that, when any one of said sides 10, 11 of the seat back 6 is moved towards the base 2, the respective seat back flap 8, 9 is pivoted inwards (arrow Ain) and, when said side 10, 11 of the seat back 6 is moved away from the base 2, said seat back flap 8, 9 is pivoted outwards (arrow Aout). In other words, when the left side 10 of the seat back 6 is moved towards the base 2, the left seat back flap 8 is pivoted inwards and, when the left side 10 of the seat back 6 is moved away from the base 2, the left seat back flap 8 is pivoted outwards. The same applies to the right seat back flap 9 pivoting inwards and outwards, respectively, when the right side 11 of the seat back 6 is moved towards and away from the base 2, respectively.

In the present example, the seat back flaps 8, 9 are located left and right of a center of the seat back 6, respectively. Alternatively the seat back flaps 8, 9 could be located on the lateral edges of the seat back 6, in a respective opening or recess of the seat back 6, or elsewhere at the respective sides 10, 11 thereof. Moreover, the hinge 12 in this example runs in the direction from top to bottom of the seat back 5 6; however, the hinge 12 could alternatively run at an angle thereto, even aslant, when the seat back flaps 8, 9 are of suitable shape, e.g. triangular. It is also possible that each seat back flap 8, 9 is composed of two or more pieces (not shown). An optional cushion C on the seat back 6 smoothens the 10 seat back 6 and pivoting of the seat back flaps 8, 9.

In this example, said first linkage 13 comprises a first push rod 14 and a second push rod 15. Each of said first and second push rods 14, 15 have one end $14_1$, $15_1$ coupled to the base 2 and the other end $14_2$, $15_2$ coupled to the respective seat back flap 8, 9. Such coupling can be achieved, e.g., by respective ball joints or the like. Alternatively, said one ends $14_1$, $15_1$ of the first and second push rods 14, 15 could be combined into a single end (not shown) which is coupled to the base 2, in which case the first and second push rods 14, 15 together form a substantially Y-shaped element.

Said other end $14_2$, $15_2$ of each push rod 14, 15 can be coupled directly to the respective seat back flap 8, 9. Optionally as in this example, however, said other end $14_2$, $15_2$ of each push rod 14, 15 is coupled to the respective seat back flap 8, 9 via a respective gear 16, 17, i.e. a left gear 16 for the left seat back flap 8 and a right gear 17 for the right seat back flap 9.

Each gear 16, 17 optionally comprises a pulley 18, 19 and a respective link 20, 21. Each link 20, 21 links the pulley 18, 19 to the respective seat back flap 8, 9. Each pulley 18, 19 is mounted to the seat back 6 rotatably about an axis G, which is parallel to said pitch axis P. On each pulley 18, 19, the link 20, 21 and said other end $14_2$, $15_2$ of the push rods 14, 15 are eccentrically articulated, respectively, i.e. the link 20 and the other end $14_2$ of the first push rod 14 are articulated on the pulley 18 at the same distances $D_1$, $D_2$ from the pulley axis G and at an angle a from each other. In alternative embodiments, the angle a could be larger or smaller than shown in this example—it could even be zero—and/or the distances $D_1$ and $D_2$ could differ from each other. The gears 16, 17 can alternatively be composed of, e.g., deflection levers or the like instead the pulleys 18, 19.

Figure 4:
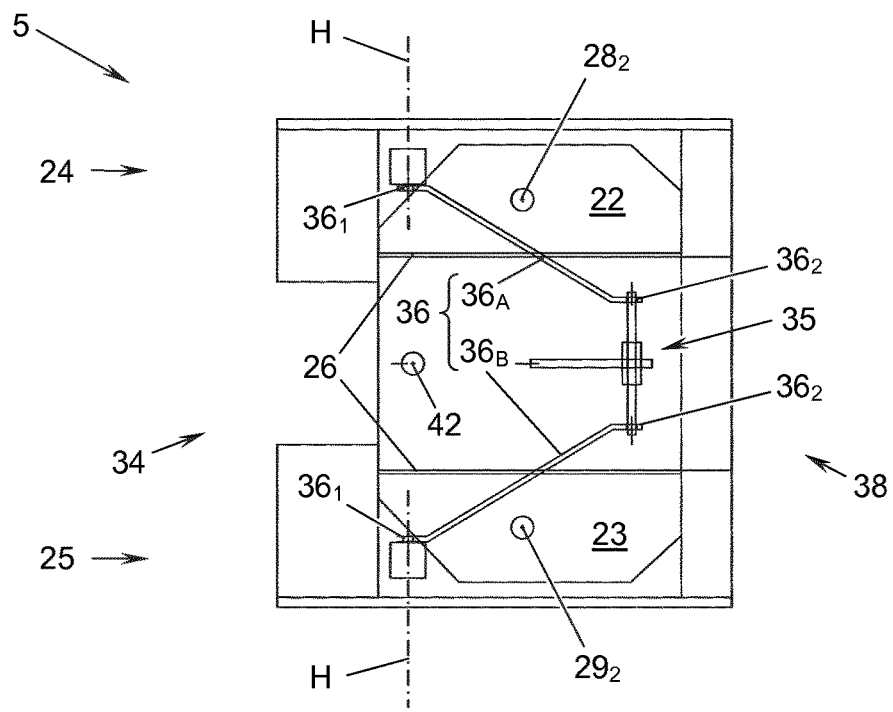
FIG. 4 shows a portion of the apparatus of FIG. 1 in a partly transparent view from below.

As shown in FIGS. 1 and 4, the seat pan 5 may optionally have a left seat pan flap 22 and a right seat pan flap 23, each of which is pivotably attached to a respective side (i.e. the left seat pan flap 22 to the left side 24 and the right seat pan flap 23 to the right side 25) of the seat pan 5 by hinges 26. A second or further linkage 27 links said seat pan flaps 22, 23 to the base 2 in a way that, when anyone of the sides 24, 25 of the seat pan 5 is moved towards the base 2, the respective seat pan flap 22, 23 is pivoted inwards (towards a person in the seat 4) and, when said side 24, 25 of the seat pan 5 is moved away from the base 2, said seat back flap 22, 23 is pivoted outwards (away from said person). In one embodiment, this can be achieved in that the second linkage 27 comprises a third push rod 28 and a forth push rod 29. Each of said third and fourth push rods 28, 29 have one end $28_1$, $29_1$ coupled to the base 2 and the other end $28_2$, $29_2$ coupled to the respective seat pan flap 22, 23, i.e. said other end $28_2$ of the third push rod 28 is coupled to the left seat pan flap 22 and said other end $29_2$ of the fourth push rod 29 is coupled to the right seat pan flap 23.

It shall be understood that each seat pan flap 22, 23 may optionally be composed of more than one pivotable element and/or be attached to the lateral edges of the seat pan 5, in a respective opening or recess of the seat pan 5, or elsewhere at the respective sides 24, 25 thereof. The hinges 26 for pivotably attaching the seat pan flaps 22, 23 to the seat pan 5 can alternatively be oriented other than in longitudinal direction of the seat pan 5 (shown in FIG. 4); and all hinges 12 and 26 of the seat back flaps 8, 9 and the seat pan flaps 22, 23 may be of any type known in the art. Furthermore, the push rods 14, 15, 28, 29 can alternatively be push elements which are not rod-shaped.

The apparatus 1 may comprise an optional lap belt 30 which passes over the seat pan 5 and can be attached thereto or to another part of the seat 4. In the present example, however, both ends $30_1$, $30_2$ of the lap belt 30 are attached to the base 2. The lap belt 30 may have a safety belt lock (not shown) for at least one of its ends $30_1$, $30_2$ or in the middle.

Furthermore, the apparatus 1 of the present example optionally comprises a left shoulder strap 31 and a right shoulder strap 32. At least one end $31_1$, $32_1$ of each shoulder strap 31, 32 may be attached to the base 2. Alternatively or in addition thereto, one end $31_1$, $32_1$ of each shoulder strap 31, 32 can be attached to the circumference 33 of the respective pulley 18, 19, i.e. one end $31_1$ of the left shoulder strap 31 to the circumference 33 of the left pulley 18 and one end $32_1$ of the right shoulder strap 32 to the circumference 33 of the right pulley 19. One end $31_1$, $32_1$ of each shoulder strap 31, 32 is optionally coupled to the lap belt 30, e.g. by sewing it to the lap belt 30 or by plugging it into a safety belt lock thereof.

The mount 7 can be of different type. In one embodiment, the mount 7 is composed of a hexapod of jacks (not shown), which jacks provide motion cueing in all six degrees of freedom as known in the art. However, different and particularly more simple mounts 7 may be applied, e.g., a mount 7 with three jacks providing motion cueing in three degrees of freedom. In another embodiment, the mount 7 may comprise a gimbal joint with two degrees of freedom, which gimbal joint mounts a forepart 34 of the seat pan 5 to the base 2 (not shown), wherein the seat 4 can be pivoted about the roll axis R and the pitch axis P due to the gimbal joint.

In yet another embodiment according to FIGS. 1 and 4, the mount 7 comprises a gimbal joint 35 with two degrees of freedom and a lever 36. One end $36_1$ of the lever 36 is mounted to the base 2 pivotably about a horizontal axis H and the other end $36_2$ of the lever 36 carries said gimbal joint 35. The gimbal joint 35 mounts the seat 4 pivotably about said roll axis R and said pitch axis P. As shown in FIG. 4, the lever 36 optionally has two arms $36_A$, $36_B$. Said one ends $36_1$ of the arms $36_A$, $36_B$ of the lever 36 are mounted to the base 2, one below the left side 24 of the seat pan 5 and the other one below the right side 25 of the seat pan 5, respectively pivotably about said horizontal axis H. The respective other ends $36_2$ of the arms $36_A$, $36_B$ carry the gimbal joint 35.

As shown in FIG. 1, the mount 7 optionally comprises an elastic element 37, e.g. a spring or a rubber tube, extending between a rear portion 38 of the seat pan 5 and the base 2. The elastic element 37 can be used in addition or even as an alternative to the aforementioned gimbal joints, i.e. the gimbal joint mounting the forepart 34 of the seat pan 5 to the base 2 or the gimbal joint 35 shown in FIGS. 1 and 4 carried by the lever 36. Moreover, the tension of the elastic element 37 can optionally be adjustable.

The mount 7 may comprise a first actuator 39 and second actuator 40 for pivoting the seat 4 about said roll axis R and said pitch axis P. In this example, the first and the second actuators 39, 40 are equal, each of them mounted to the base 2; the first actuator 39 is coupled to the left side 10 of the seat back 6 and the second actuator 40 is coupled to the right side 11 of the seat back 6. In other embodiments, the first actuator could be coupled to a central part of the seat back 6 for pivoting the seat 4 about the pitch axis P, while the second actuator 40 is coupled to one of the sides 10, 11 of the seat back 6 or, e.g., to the upper end of said first actuator 39 for pivoting the seat 4 about the roll axis R. In still another embodiment, the first and the second actuators 39, 40 could be coupled to the seat pan 5 instead of the seat back 6, particularly to the forepart 34 of the seat pan 5.

Here, the mount 7 further comprises an optional third actuator 41. Together with the first and second actuators 39, 40, 5 the third actuator 41 enables lifting and lowering the seat 4. According to FIG. 4, the third actuator 41 is coupled to the forepart 34 of the seat pan 5 at a central point 42 thereof. When, in contrast thereto, the first and second actuators 39, 40 are coupled to the forepart 34 of the seat pan 5, the third 10 actuator 41 could be coupled to the rear portion 38 of the seat back 6.

The actuators 39, 40, 41 can be of any type known in the art, e.g. electrically, hydraulically or pneumatically extendable elements, e.g. linear actuators ("jacks"), as known to the person skilled in the art. Moreover, the first, second and third actuators 39, 40, 41 could be of different type. One possible embodiment of such actuators 39, 40, 41 shall now be explained on the basis of the first actuator 39 shown in FIGS. 1 and 3.

The first actuator 39 comprises an electric motor 43 mounted to the base 2. The motor 43 has a worm gear 44 attached thereto and a lever 45, one end $45_1$ of which being coupled to an output shaft 46 of the worm gear 44 rotatably about a shaft axis S. The first actuator 39 also comprises a further push rod 47, one end $47_1$ of which being coupled to the other end $45_2$ of the lever 45 rotatably about a lever axis L and the other end $47_2$ of which being connected to the seat 4, in the present example, to the seat back 6, e.g., to the pulley axis G of the left pulley 18.

Optionally, the mount comprises at least one further elastic element 48 which extends between the seat pan 5 or the seat back 6 and the base 2 at one of the respective sides 10, 11, 24, 25 thereof, for bringing the seat 4 in a rest position relative to the base 2 as shown in FIG. 1. In this example, there are four such further elastic elements 48, one of which extending from the left side 24 of the forepart 34 of the seat pan 5 to the base 2, another one from the left side 10 of the seat back 6 and the remaining ones (not visible in FIG. 1) from the respective right sides 11, 25 to the base 2.

The disclosed subject matter is not restricted to these specific embodiments described in detail herein but encompasses all variants, combinations, and modifications thereof that fall within the frame of the appended claims.

What is claimed is:

1. An apparatus for simulating motion, comprising:
   a base;
   a seat with a seat pan and a seat back, the seat having a roll axis and, orthogonal thereto, a pitch axis;
   a mount mounting the seat to the base at least pivotably about said roll axis and said pitch axis;
   a left seat back flap and a right seat back flap each of which being pivotably attached to a respective side of the seat back; and
   a linkage linking said seat back flaps to the base so that, when any one of the sides of the seat back is moved towards the base, the respective seat back flap is pivoted inwards and, when said side of the seat back is moved away from the base, said seat back flap is pivoted outwards.

2. The apparatus according to claim 1, wherein said linkage comprises a first push rod and a second push rod, each of said first and second push rods having one end coupled to the base and the other end coupled, directly or via a gear, to the respective seat back flap.

3. The apparatus according to claim 2, wherein said other end of each of the first and second push rods is coupled to the respective seat back flap via a gear comprising a pulley and a link to said seat back flap, the pulley being mounted to the seat back rotatably about an axis parallel to said pitch axis, and each of said link and said other end being eccentrically articulated on the pulley.

4. The apparatus according to claim 3, comprising a left and a right shoulder strap, wherein one end of each shoulder strap is attached to the circumference of the respective pulley.

5. The apparatus according to claim 1, wherein the seat pan has a left seat pan flap and a right seat pan flap each of which being pivotably attached to a respective side of the seat pan, and
   wherein a further linkage links said seat pan flaps to the base so that, when any one of the sides of the seat pan is moved towards the base, the respective seat pan flap is pivoted inwards and, when said side of the seat pan is moved away from the base, said seat back flap is pivoted outwards.

6. The apparatus according to claim 5, wherein said further linkage comprises a third push rod and a forth push rod, each of said third and forth push rods having one end coupled to the base and the other end coupled to the respective seat pan flap.

7. The apparatus according to claim 1, comprising a lap belt passed over the seat pan, wherein both ends of the lap belt are attached to the base.

8. The apparatus according to claim 7, comprising a left and a right shoulder strap, wherein one end of each shoulder strap is coupled to the lap belt.

9. The apparatus according to claim 1, comprising a left and a right shoulder strap, wherein at least one end of each shoulder strap is attached to the base.

10. The apparatus according to claim 1, wherein the mount comprises a gimbal joint with two degrees of freedom, which gimbal joint mounts a forepart of the seat pan to the base pivotably about said roll axis and said pitch axis.

11. The apparatus according to claim 1, wherein the mount comprises a gimbal joint with two degrees of freedom and a lever, wherein one end of the lever is mounted to the base pivotably about a horizontal axis and wherein the other end carries said gimbal joint to mount the seat pivotably about said roll axis and said pitch axis.

12. The apparatus according to claim 1, wherein the mount comprises an elastic element extending between a rear portion of the seat pan and the base.

13. The apparatus according to claim 1, wherein the mount comprises a first and a second actuator for pivoting the seat about said roll axis and said pitch axis.

14. The apparatus according to claim 13, wherein the mount further comprises a third actuator for lifting and lowering the seat, together with said first and second actuators.

15. The apparatus according to claim 1, wherein the mount comprises at least one further elastic element for bringing the seat in a rest position relative to the base.

* * * * *